United States Patent
Guarneros et al.

(10) Patent No.: US 8,973,999 B2
(45) Date of Patent: Mar. 10, 2015

(54) RECLINING VEHICLE SEAT WITH ACTUATOR AND MOTOR

(75) Inventors: Guillermo César Cervantes Guarneros, Atizapan de Zaragoza (MX); Alejandro Rosas Vazquez, Gustavo A. Madero (MX); Alfredo Guerrero Ortiz, Mexico City (MX); Mario Garcia Lannoy, Toluca (MX)

(73) Assignee: Ford Global Technologies, LLC, Dearborn, MI (US)

( * ) Notice: Subject to any disclaimer, the term of this patent is extended or adjusted under 35 U.S.C. 154(b) by 301 days.

(21) Appl. No.: 13/431,568

(22) Filed: Mar. 27, 2012

(65) Prior Publication Data

US 2013/0257129 A1 Oct. 3, 2013

(51) Int. Cl.
*B60N 2/20* (2006.01)
*B60N 2/235* (2006.01)
*B60N 2/02* (2006.01)

(52) U.S. Cl.
CPC ......... *B60N 2/2356* (2013.01); *B60N 2002/024* (2013.01); *B60N 2205/50* (2013.01)
USPC ................................. 297/362.11; 297/362.12

(58) Field of Classification Search
USPC ...... 297/361.1, 362.11, 362.12, 367 P, 367 L, 297/367 R, 363, 364, 365
See application file for complete search history.

(56) References Cited

U.S. PATENT DOCUMENTS

| | | | |
|---|---|---|---|
| 4,880,274 A | 11/1989 | Ichikawa | |
| 5,234,255 A | 8/1993 | Kawakita | |
| 6,042,190 A * | 3/2000 | Mathe et al. | 297/483 |
| 6,893,092 B1 | 5/2005 | Krambeck | |
| 7,093,901 B2 * | 8/2006 | Yamada | 297/367 R |
| 7,648,206 B2 * | 1/2010 | Wieclawski | 297/378.12 |
| 7,866,696 B2 * | 1/2011 | Wang et al. | 280/748 |
| 2005/0110321 A1 | 5/2005 | Krambeck | |
| 2009/0134682 A1 * | 5/2009 | Andou et al. | 297/362.12 |
| 2010/0320823 A1 * | 12/2010 | Thiel | 297/354.1 |
| 2011/0127814 A1 * | 6/2011 | Thiel | 297/216.1 |
| 2013/0207428 A1 * | 8/2013 | Aschaber et al. | 297/331 |

FOREIGN PATENT DOCUMENTS

JP 2008245824 A 10/2008

* cited by examiner

*Primary Examiner* — David R Dunn
*Assistant Examiner* — Timothy J Brindley
(74) *Attorney, Agent, or Firm* — Vichit Chea; Price Heneveld LLP

(57) ABSTRACT

A reclining seat for a vehicle includes a seat and a seat back pivotally coupled to the seat. The reclining seat also includes an actuator for adjusting the inclination of the seat back relative to the seat. The actuator includes a lockable reclining mechanism, a motor for selectively unlocking the reclining mechanism and permitting manual adjustment of the inclination of the seat back, and an actuator switch electrically coupled to the motor for selectively energizing the motor.

15 Claims, 4 Drawing Sheets

RECLINING VEHICLE SEAT WITH ACTUATOR AND MOTOR

FIELD OF THE INVENTION

The present invention generally relates to a vehicle seat, and more specifically, a reclining vehicle seat having an actuator and a motor for adjusting the inclination of the seat back.

BACKGROUND OF THE INVENTION

Vehicle seats generally include a reclining mechanism for selective adjustment of the angular position of the seat back relative to the seat, allowing a user to recline or incline the seat back. Manually operated reclining mechanisms generally have a locked position, in which the seat back cannot pivot, and an unlocked position, in which the seat back can be pivoted. A user manually pulls a handle or lever that is operably coupled to the reclining mechanism to unlock it, allowing adjustment of the seat back position. Releasing the lever relocks the reclining mechanism, thus retaining the seat back in the adjusted position.

SUMMARY OF THE INVENTION

One aspect of the present invention includes a reclining seat for a vehicle. The reclining seat includes a seat and a seat back pivotally coupled to the seat. An actuator adjusts the inclination of the seat back relative to the seat. The actuator includes a lockable reclining mechanism. A servo motor selectively unlocks the reclining mechanism and permits manual adjustment of the inclination of the seat back. A push button is electrically coupled to the servo motor for selectively energizing the servo motor.

Another aspect of the present invention includes a vehicle seat actuator for adjusting the inclination of a seat back relative to a seat. The actuator includes a lockable reclining mechanism. A motor selectively unlocks the reclining mechanism and permits manual adjustment of the inclination of the seat back. An actuator switch is electrically coupled to the motor for selectively energizing the motor.

Another aspect of the present invention includes an actuator for adjusting the inclination of a vehicle seat back relative to a seat. The actuator includes two lockable reclining mechanisms disposed on opposite lateral sides of the seat and a shaft extending therebetween. A motor is coupled to the shaft for selectively unlocking the reclining mechanisms and permitting adjustment of the inclination of the seat back. An actuator switch is electrically coupled to the motor for selectively energizing the motor.

Yet another aspect of the present invention includes a vehicle seat having a motorized actuator for adjusting the inclination of a seat back relative to the seat. The actuator includes a motor, a shaft, and a pair of lockable reclining mechanisms, generally referred to as recliner hearts. The shaft extends between the lockable reclining mechanisms and is coupled thereto, and the motor is coupled to the shaft. An actuator switch, which may be in the form of a push button, selectively energizes the motor, turning the shaft and unlocking the reclining mechanisms. With the reclining mechanisms unlocked, the seat back is free to be manually adjusted. When the desired inclination is achieved, the actuator switch is deactuated, which rotates the motor and shaft back to their original positions, and relocks the reclining mechanisms and seat back.

These and other aspects, objects, and features of the present invention will be understood and appreciated by those skilled in the art upon studying the following specification, claims, and appended drawings.

DETAILED DESCRIPTION OF EMBODIMENTS

Figure 1:
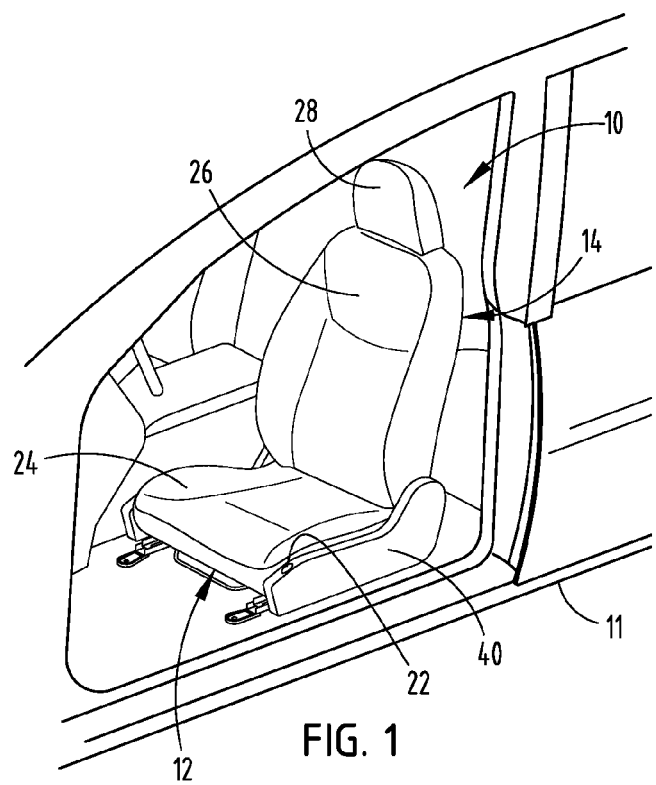
FIG. 1 is a top perspective view of a reclining vehicle seat disposed inside a vehicle.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1-6, the reference numeral 10 generally designates a reclining seat for a vehicle 11. The reclining seat 10 includes a seat 12 and a seat back 14 pivotally coupled to the seat 12. The reclining seat 10 also includes an actuator 16 for adjusting the inclination of the seat back 14 relative to the seat 12. The actuator 16 includes a lockable reclining mechanism 18 and a motor 20 for selectively unlocking the reclining mechanism 18 and permitting manual adjustment of the inclination of the seat back 14. The actuator 16 further includes an actuator switch 22 electrically coupled to the motor 20 for selectively energizing the motor 20.

As shown in FIG. 1, the reclining seat 10 is generally configured for use in a variety of vehicles 11 in either a front driver seat, a front passenger seat, or a rear seat of the vehicle 11 and generally includes the seat back 14 and the seat 12, each having a cushion 24, 26, respectively. A headrest 28 is also mounted to the top of the seat back 14. The seat 12 may be configured to be mounted on a support surface, such as a floor pan of the vehicle 11. A track assembly may be coupled to the seat 12 to facilitate fore and aft positioning of the reclining seat 10. The reclining seat 10 is generally designed for the comfort of a passenger, as well as to accommodate and protect a passenger during a collision event. Additionally, in FIGS. 1-3, the seat back 14 is shown in a substantially upright seating position.

Figure 2:
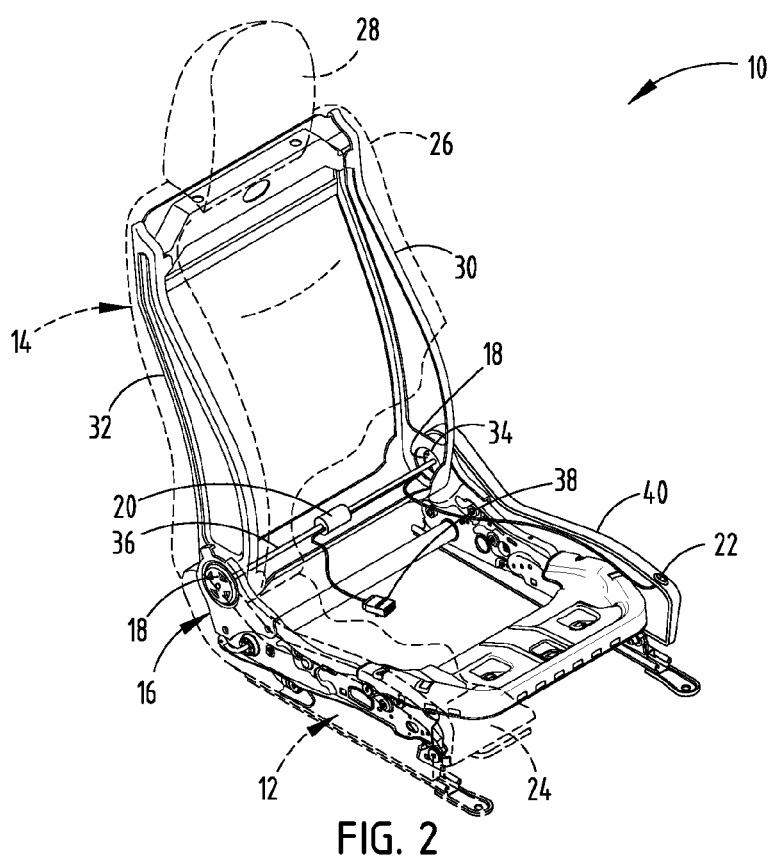
FIG. 2 is a top perspective view of the reclining seat of FIG. 1.

Referring now to FIG. 2, the seat back 14 includes first and second vehicle seat back support members 30, 32 disposed on opposite lateral sides of the reclining seat 10 and of substantially mirror image construction relative to one another. The first and second vehicle seat back members 30, 32 form a portion of the frame of the seat back 14 and are generally designed to provide substantial support to the occupant's back and to help protect an occupant during a collision event. Each of the first and second vehicle seat back support members 30, 32 includes a reclining mechanism aperture 34 disposed near the bottom thereof and adapted to receive reclining mechanisms 18, which are commonly referred to in the art as "recliner hearts." The recliner hearts 18 are affixed directly to the first and second vehicle seat back support members 30, 32 via laser welding, or other suitable affixing means. The recliner hearts 18 provide a direct interface between the first and second vehicle seat back support members 30, 32 and the seat 12.

Figure 3:
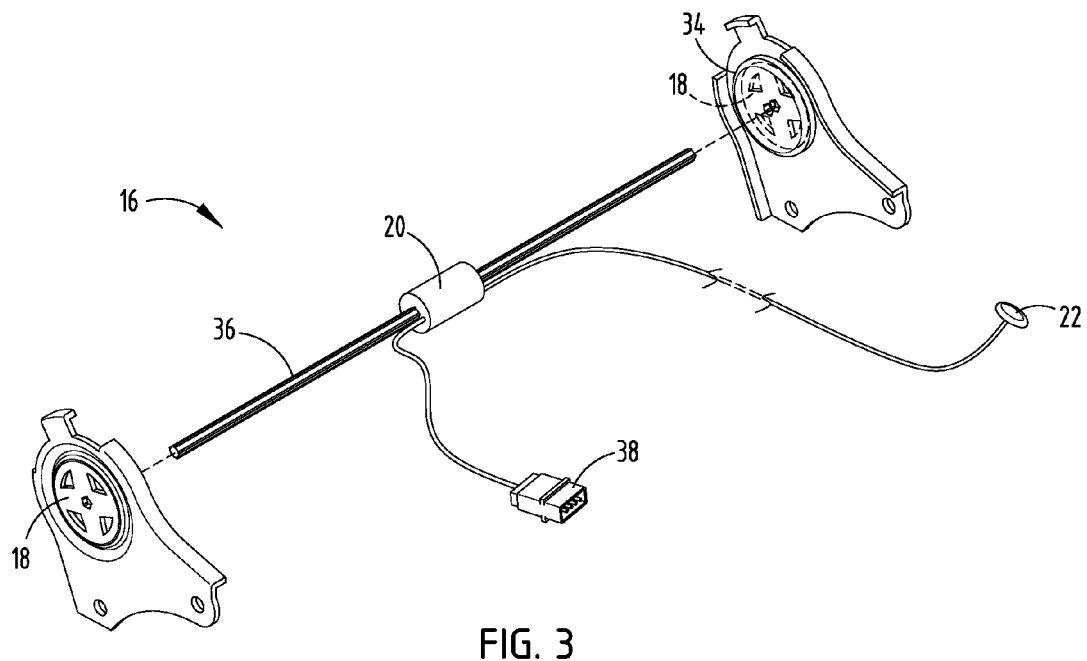
FIG. 3 is a partially exploded top perspective view of an actuator of the reclining seat of FIG. 1.

Referring to FIG. 3, in addition to the recliner hearts 18, motor 20, and actuator switch 22, the actuator 16 also includes a shaft 36 that extends between opposite lateral sides of the reclining seat 10 and operably connects the recliner hearts 18. The motor 20 is operably coupled to the shaft 36 in a 1:1 relationship, and in the embodiment illustrated in the figures, is shown oriented parallel to the axis of the shaft 36. However, it is feasible to have the motor 20 operably coupled to the shaft 36 yet mounted in other orientations and with other gearing ratios. The amount of rotation required of the motor 20 and shaft 36 may vary from seat to seat, depending, at least in part, on the particular recliner hearts 18 utilized for the actuator 16. For example, the motor 20 and shaft 36 may rotate 30 degrees to unlock the recliner hearts 18. Further, the motor 20 is electrically coupled to the vehicle electrical system via an electrical connector 38, which may be positioned in any suitable location within or remote from the reclining seat 10.

The motor 20 may be a servomotor or a stepper motor, though any suitable type of motor is contemplated. The motor 20 is able to accurately control the angular position of the connected shaft 36. As an example, the motor 20 may be an integrated stepper motor capable of a high microstepping resolution with all the necessary controls and electronics mounted within the motor 20 itself. It is contemplated that the motor 20 is capable of delivering approximately 6 Newton-meters of torque, though the torque requirement is exemplary and is not meant to be so limiting.

According to an embodiment of the invention, the actuator switch 22 is illustrated in the form of an electronic push button, though it should be understood that any suitable input device, such as a toggle switch, rocker switch, or micro switch could also be utilized. The push button 22 is electrically connected to the motor 20 for selectively energizing the motor 20. The push button 22 is shown mounted to a side shield 40 disposed on the lateral side of the seat 12. The side shield 40 is primarily a decorative trim component, though it may include a variety of apertures and connecting points for securing various mechanical devices thereto, as well as for securing the side shield 40 to the reclining seat 10. The push button 22 may be mounted sub-flush to a surface of the side shield 40, thereby eliminating, or at least reducing, the possibility of inadvertently actuating the push button 22. Alternatively, the push button 22 could be located in other interior locations, for example, in the vehicle door, instrument panel, or any other suitably reachable location.

It is contemplated that the actuator switch 22 is an on/off type switch, which an occupant actuates for "ON," and releases for "OFF." As an example, the actuator switch 22 is a push button with a diameter of approximately 25 mm (or 25 mm×25 mm for a square button). Further, the actuator switch 22 may be provided in a variety of colors and textures, may include a chrome ring or accents, and may be illuminated.

Figure 4:
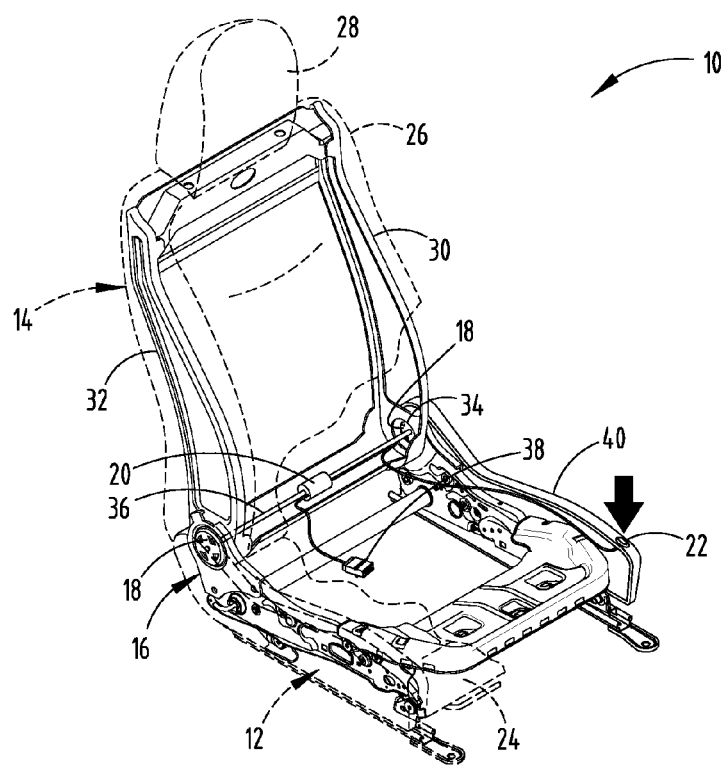
FIG. 4 is a top perspective view of the reclining seat, illustrating activating the actuator.
Figure 5:
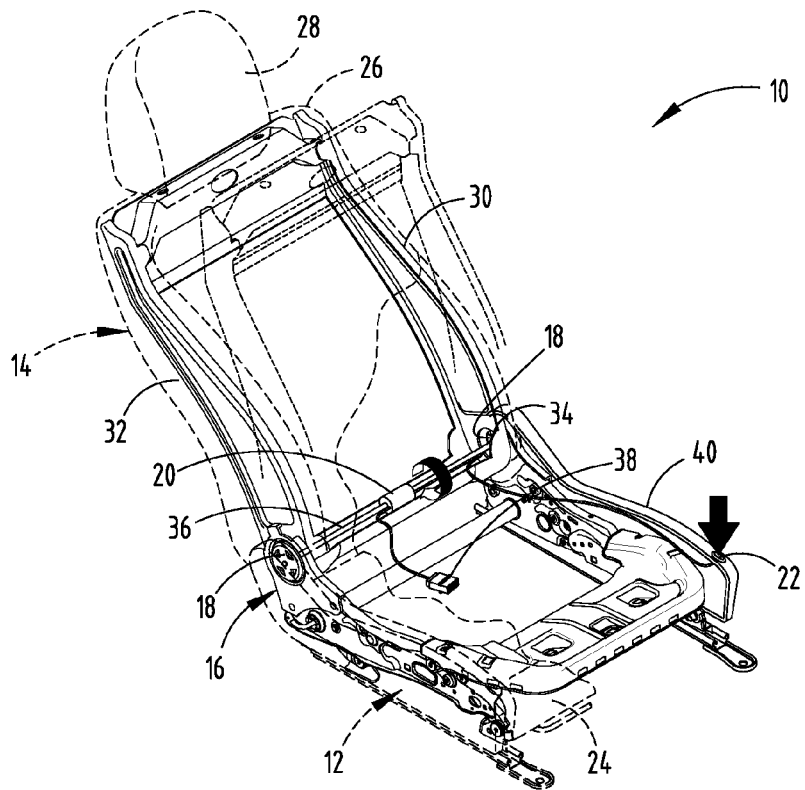
FIG. 5 is a top perspective view of the reclining seat, illustrating adjusting the inclination of a seat back of the reclining seat.
Figure 6:
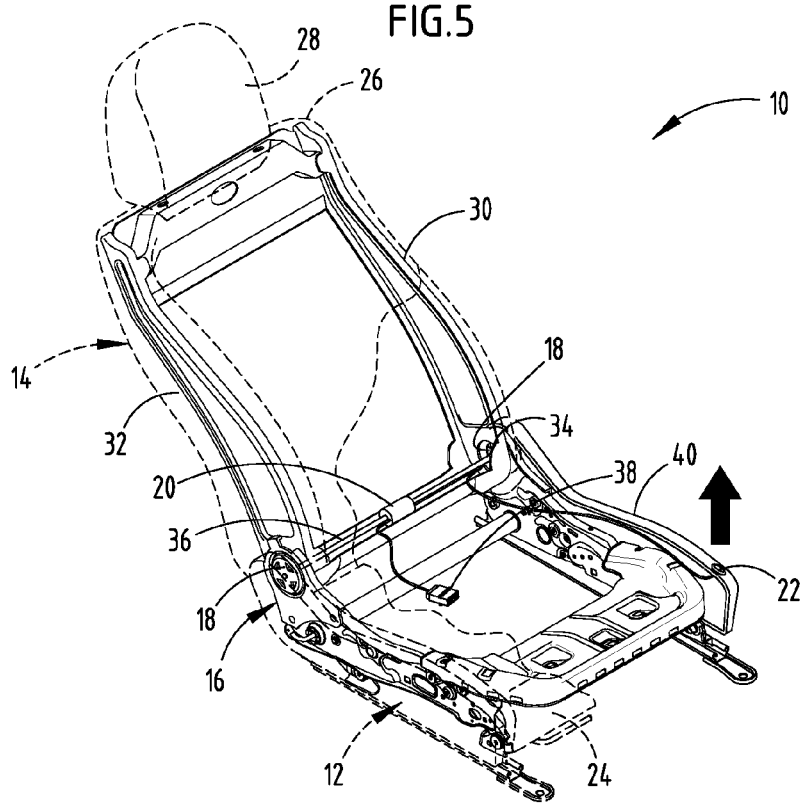
FIG. 6 is a top perspective view of the reclining seat, illustrating the adjusted position.
Figure 7:
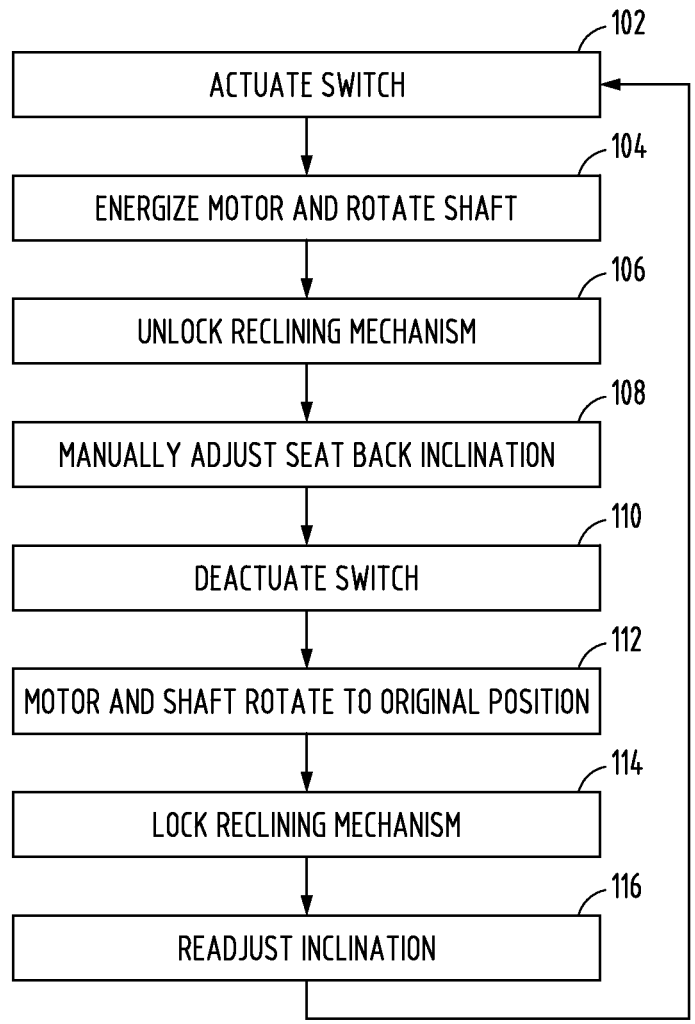
FIG. 7 is a flow chart illustrating a method of adjusting the inclination of the seat back.

In operation, an occupant may wish to adjust the inclination of the seat back 14 relative to the seat 12. According to one embodiment illustrated in FIG. 7, a method 100 for adjusting the inclination of the seat back 14 begins at step 102. In this initial seat back 14 position illustrated in FIG. 2, the recliner hearts 18 are locked and the seat back 14 is not free to move. To adjust the seat back 14, the occupant may depress the push button 22 as in step 102, thereby energizing the motor 20 and rotating the connected shaft 36 in a first direction at step 104 and as shown in FIGS. 4-5. In step 106, rotating the shaft 36 unlocks a cam internal to each of the recliner hearts 18, effectively unlocking the recliner hearts 18. The recliner hearts 18 remain unlocked while the push button 22 is depressed. At step 108, with the push button 22 depressed and the recliner hearts 18 unlocked, the occupant may manually adjust the seat back 14 to the desired inclination, whether it be more or less reclined. The recliner hearts 18, and therefore the seat back 14, are biased toward the upright position, so the occupant must manually push the seat back 14 rearward to recline the seat back 14 further. Once the desired inclination is achieved, the push button 22 may be released, as in step 110 and illustrated in FIG. 6, thereby locking the seat back 14 in the adjusted position. Releasing the push button 22 causes the motor 20 and shaft 36 to rotate in an opposite, second direction in step 112. The motor 20 and shaft 36 rotate back to their original positions, relocking the recliner hearts 18 and seat back 14 relative to the seat 12, as in step 114. In step 116, if further adjustment is desired, the method 100 may be repeated by cycling back to step 102, actuating the push button 22.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A reclining seat for a vehicle comprising:
    a seat;
    a seat back pivotally coupled to the seat; and
    an actuator for adjusting the inclination of the seat back relative to the seat and comprising:
        a lockable reclining mechanism including a shaft extending between two recliner hearts;
        a servo motor disposed between the recliner hearts for selectively unlocking an internal cam of the recliner hearts and permitting manual adjustment of the inclination of the seat back; and
        a push button electrically coupled to the servo motor for selectively energizing the servo motor.

2. The reclining seat of claim 1, wherein the actuator includes two lockable reclining mechanisms disposed on opposite lateral sides of the reclining seat.

3. The reclining seat of claim 2, wherein a shaft extends between the opposite lateral sides of the seat and is coupled to the two lockable reclining mechanisms.

4. The reclining seat of claim 3, wherein the motor is coupled to the shaft.

5. The reclining seat of claim 4, wherein the motor selectively rotates the shaft.

6. The reclining seat of claim 5, wherein actuating the push button rotates the shaft in a first direction, unlocking the two lockable reclining mechanisms.

7. The reclining seat of claim 5, wherein releasing the push button rotates the shaft in a second direction, locking the two lockable reclining mechanisms.

8. A vehicle seat actuator for adjusting the inclination of a seat back relative to a seat comprising:
    a lockable reclining mechanism including first and second recliner hearts and a shaft disposed therebetween;
    an actuator having two lockable reclining mechanisms disposed on opposite lateral sides of the seat, wherein a shaft extends between the opposite lateral sides of the seat and is coupled to the two lockable reclining mechanisms;
    a motor in line with the shaft and configured to selectively unlock the reclining mechanism and permit manual adjustment of the inclination of the seat back, wherein the motor is coupled with and selectively rotates the shaft; and
    an actuator switch electrically coupled to the motor for selectively energizing the motor.

9. The vehicle seat actuator of claim 8, wherein actuating the switch rotates the shaft in a first direction, unlocking the two lockable reclining mechanisms.

10. The vehicle seat actuator of claim 8, wherein releasing the switch rotates the shaft in a second direction, locking the two lockable reclining mechanisms.

11. The vehicle seat actuator of claim 8, wherein the motor is a servo motor.

12. The vehicle seat actuator of claim 8, wherein the switch is a push-button.

13. An actuator for adjusting the inclination of a vehicle seat back relative to a seat bottom comprising:
    two lockable reclining mechanisms disposed on opposite lateral sides of the seat bottom and having a shaft extending therebetween;
    a motor selectively rotating the shaft and selectively unlocking the reclining mechanisms to permit manual adjustment of the inclination of the seat back; and
    an actuator switch electrically coupled to the motor for selectively energizing the motor.

14. The vehicle seat actuator of claim 13, wherein the motor is a servo motor.

15. The vehicle seat actuator of claim 13, wherein the switch is a push-button.

* * * * *